US012020623B2

(12) United States Patent
Hwang et al.

(10) Patent No.: US 12,020,623 B2
(45) Date of Patent: Jun. 25, 2024

(54) GAMMA CORRECTION METHOD FOR A DISPLAY DEVICE

(71) Applicant: SAMSUNG DISPLAY CO., LTD., Yongin-si (KR)

(72) Inventors: Moonsang Hwang, Seoul (KR); Donghak Pyo, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/156,536

(22) Filed: Jan. 19, 2023

(65) Prior Publication Data

US 2023/0316979 A1 Oct. 5, 2023

(30) Foreign Application Priority Data

Apr. 4, 2022 (KR) ........................ 10-2022-0041527

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2320/0276* (2013.01); *G09G 2320/0693* (2013.01); *G09G 2330/12* (2013.01); *G09G 2360/16* (2013.01)

(58) Field of Classification Search
None
See application file for complete search history.

(56) References Cited

U.S. PATENT DOCUMENTS

2003/0122759 A1* 7/2003 Abe .......................... G09G 3/22 345/89
2010/0103083 A1* 4/2010 Shin ...................... G09G 3/3208 345/76
2019/0088199 A1* 3/2019 Zhang .................. G09G 3/3258
2020/0335040 A1* 10/2020 Nho ..................... G09G 3/3233
2021/0065623 A1* 3/2021 Hong ................... G09G 3/3266

FOREIGN PATENT DOCUMENTS

| | | |
|---|---|---|
| KR | 10-1272367 | 5/2013 |
| KR | 10-2016-0016232 | 2/2016 |
| KR | 10-1699089 | 1/2017 |
| KR | 10-2070375 | 1/2020 |
| KR | 10-2118078 | 5/2020 |

* cited by examiner

*Primary Examiner* — Matthew Yeung
(74) *Attorney, Agent, or Firm* — F. Chau & Associates, LLC

(57) ABSTRACT

The gamma correction method for a display device measures a first driving current according to a first grayscale voltage corresponding to the low grayscale value, determines a predicted luminance based on a driving current-luminance calibration function and the first driving current, compares the predicted luminance and a first target luminance for the low grayscale value, determines a first offset value based on the first driving current and the first target luminance when the predicted luminance is different from the first target luminance, and corrects the first grayscale voltage based on the first offset value. That is, the gamma correction method may measure the driving current to perform gamma correction for the low grayscale value, and shorten a process time of the gamma correction compared to performing the gamma correction for the low grayscale value by measuring luminance.

20 Claims, 8 Drawing Sheets

DLT

| IDATA(A) | Luminance(nit) |
| --- | --- |
| 10 | 10 |
| 15 | 15 |
| 20 | 20 |
| ⋮ | ⋮ |

GAMMA CORRECTION METHOD FOR A DISPLAY DEVICE

CROSS-REFERENCE

This application claims priority under 35 U.S.C. § 119 to Korean Patent Application No. 10-2022-0041527, filed on Apr. 4, 2022 in the Korean Intellectual Property Office KIPO, the disclosure of which is herein incorporated by reference in its entirety.

FIELD

Embodiments of the present inventive concept relate to display devices. More particularly, embodiments of the present inventive concept relate to a gamma correction method for a display device.

DISCUSSION

A display device may include a display panel, a timing controller, a gate driver, and a source driver. The display panel may include a plurality of gate lines, a plurality of data lines, and a plurality of pixels electrically connected to the gate lines and the data lines. The gate driver may provide gate signals to the gate lines. The source driver may provide data voltages to the data lines. The timing controller may control the gate driver and the source driver.

In cases where an image quality of a finished display device product does not initially reach a target value due to anomalies in a manufacturing process or the like, the product might be discarded. If all finished products having image qualities that did not initially reach the target value were discarded, an average yield might be significantly lowered.

In such cases, it may be worthwhile to post-correct the image quality of the display device to reach target values. Accordingly, gamma correction may be performed so that the display device has a gamma characteristic corresponding to a target gamma value for the display device to meet the target image quality.

For example, one such gamma correction process might involve the display device attempting to match a luminance of each of the grayscale values to the target luminance. In such a gamma correction, the luminance of each of the grayscale values might be measured several times. In a case of a low grayscale value, a luminance measurement time might increase and an accuracy of the gamma correction might decrease due to performance limitations of a light receiving element or other components of a luminance sensor or meter.

SUMMARY

Embodiments of the present inventive concept may provide a gamma correction method for a display device that measures a driving current to perform a gamma correction for a low grayscale value.

A descriptive gamma correction method embodiment is provided by way of example for application to relatively low grayscale values of a display device. The method measures a first driving current for a first grayscale voltage corresponding to a low grayscale value, rather than attempting to measure its luminance directly.

According to some embodiments of the present inventive concept, a gamma correction method for a display device includes measuring a first driving current according to a first grayscale voltage corresponding to a low grayscale value, determining a predicted luminance based on a driving current-luminance calibration function and the first driving current, comparing the predicted luminance and a first target luminance for the low grayscale value, determining a first offset value based on the first driving current and the first target luminance when the predicted luminance is different from the first target luminance, and correcting the first grayscale voltage based on the first offset value.

In an embodiment, the gamma correction method may further include measuring luminance according to a second grayscale voltage corresponding to a high grayscale value, comparing the luminance according to the second grayscale voltage and a second target luminance for the high grayscale value, determining a second offset value based on the luminance according to the second grayscale voltage and the second target luminance when the luminance according to the second grayscale voltage is different from the second target luminance, and correcting the second grayscale voltage based on the second offset value.

In an embodiment, the gamma correction method may further include not further correcting the first grayscale voltage when the predicted luminance is substantially equal to the first target luminance.

In an embodiment, measuring the first driving current, determining the predicted luminance, comparing, determining the first offset value, and correcting the first grayscale voltage may be repeated until the predicted luminance is substantially equal to the first target luminance.

In an embodiment, the gamma correction method may further include measuring a luminance according to the first grayscale voltage once, and the driving current-luminance calibration function is defined by a lookup table including the luminance according to the first grayscale voltage.

In an embodiment, determining the first offset value may include determining a target current using the driving current-luminance calibration function and the first target luminance, determining a target grayscale voltage using a driving current-grayscale voltage calibration function or expression, the first driving current, and the target current, and determining the first offset value by subtracting the first grayscale voltage from the target grayscale voltage.

In an embodiment, the driving current-grayscale voltage calibration function or expression may be updated according to the first driving current.

In an embodiment, the gamma correction method may further include separately driving each of panel blocks of a display panel to measure the first driving current for each of the panel blocks according to the first grayscale voltage, and calculating a deviation of the first driving current according to a position of each of the panel blocks, and the target grayscale voltage may be determined differently for each position of the display panel according to the deviation of the first driving current.

In an embodiment, the gamma correction method may further include separately driving a region of a display panel except for each of panel blocks of the display panel to measure the first driving current for the region of the display panel except for each of the panel blocks according to the first grayscale voltage, and calculating a deviation of the first driving current according to a position of each of the panel blocks, and the target grayscale voltage may be determined differently for each position of the display panel according to the deviation of the first driving current.

In an embodiment, the first grayscale voltage may be corrected by adding the first offset value to the first grayscale voltage.

In an embodiment, the first driving current may be measured by a current sensor connected to a power line to which a power voltage is applied, and the power voltage may be applied to a display panel through the power line.

According to embodiments of the present inventive concept, the gamma correction method for a display device includes measuring a first driving current N times, where N is a positive integer greater than or substantially equal to 2, according to a grayscale voltage corresponding to a low grayscale value, calculating an average value of the first driving current measured N times, determining a predicted luminance based on a driving current-luminance calibration function and the average value of the first driving current, comparing the predicted luminance and a first target luminance for the low grayscale value, determining a first offset value based on the average value of the first driving current and the first target luminance when the predicted luminance is different from the first target luminance, and correcting the first grayscale voltage based on the first offset value.

In an embodiment, the gamma correction method may further include measuring luminance according to a second grayscale voltage corresponding to a high grayscale value, comparing the luminance according to the second grayscale voltage and a second target luminance for the high grayscale value, determining a second offset value based on the luminance according to the second grayscale voltage and the second target luminance when the luminance according to the second grayscale voltage is different from the second target luminance, and correcting the second grayscale voltage based on the second offset value.

In an embodiment, the gamma correction method may further include measuring a luminance according to the first grayscale voltage once, and the driving current-luminance calibration function is defined by a lookup table including the luminance according to the first grayscale voltage.

In an embodiment, determining the first offset value may include determining a target current using the driving current-luminance calibration function and the first target luminance, determining a target grayscale voltage using a driving current-grayscale voltage calibration function or expression, the average value of the first driving current, and the target current, and determining the first offset value by subtracting the first grayscale voltage from the target grayscale voltage.

In an embodiment, the driving current-grayscale voltage calibration function or expression is updated according to the first driving current.

In an embodiment, the gamma correction method may further include separately driving each of panel blocks of a display panel to measure the first driving current for each of the panel blocks according to the first grayscale voltage, and calculating a deviation of the first driving current according to a position of each of the panel blocks, and the target grayscale voltage may be determined differently for each position of the display panel according to the deviation of the first driving current.

In an embodiment, The gamma correction method may further include separately driving a region of a display panel except for each of panel blocks of the display panel to measure the first driving current for the region of the display panel except for each of the panel blocks according to the first grayscale voltage, and calculating a deviation of the first driving current according to a position of each of the panel blocks, and the target grayscale voltage may be determined differently for each position of the display panel according to the deviation of the first driving current.

In an embodiment, the first grayscale voltage may be corrected by adding the first offset value to the first grayscale voltage.

In an embodiment, the first driving current may be measured by a current sensor connected to a power line to which a power voltage is applied, and wherein the power voltage may be applied to a display panel through the power line.

Therefore, a gamma correction method embodiment may measure a driving current to perform gamma correction for a low grayscale value by measuring a first driving current according to a first grayscale voltage corresponding to the low grayscale value, determining a predicted luminance based on a driving current-luminance calibration function and the first driving current, comparing the predicted luminance and a first target luminance for the low grayscale value, determining a first offset value based on the first driving current and the first target luminance when the predicted luminance is different from the first target luminance, and correcting the first grayscale voltage based on the first offset value. Accordingly, this gamma correction method embodiment may shorten a process time of the gamma correction compared to performing the gamma correction for the low grayscale value by measuring luminance.

However, embodiments of the present inventive concept are not limited to those described above, and may be variously expanded without departing from the spirit and scope of the present disclosure.

DETAILED DESCRIPTION

Hereinafter, the present inventive concept will be explained in greater detail by way of example with reference to the accompanying drawings.

Figure 1:
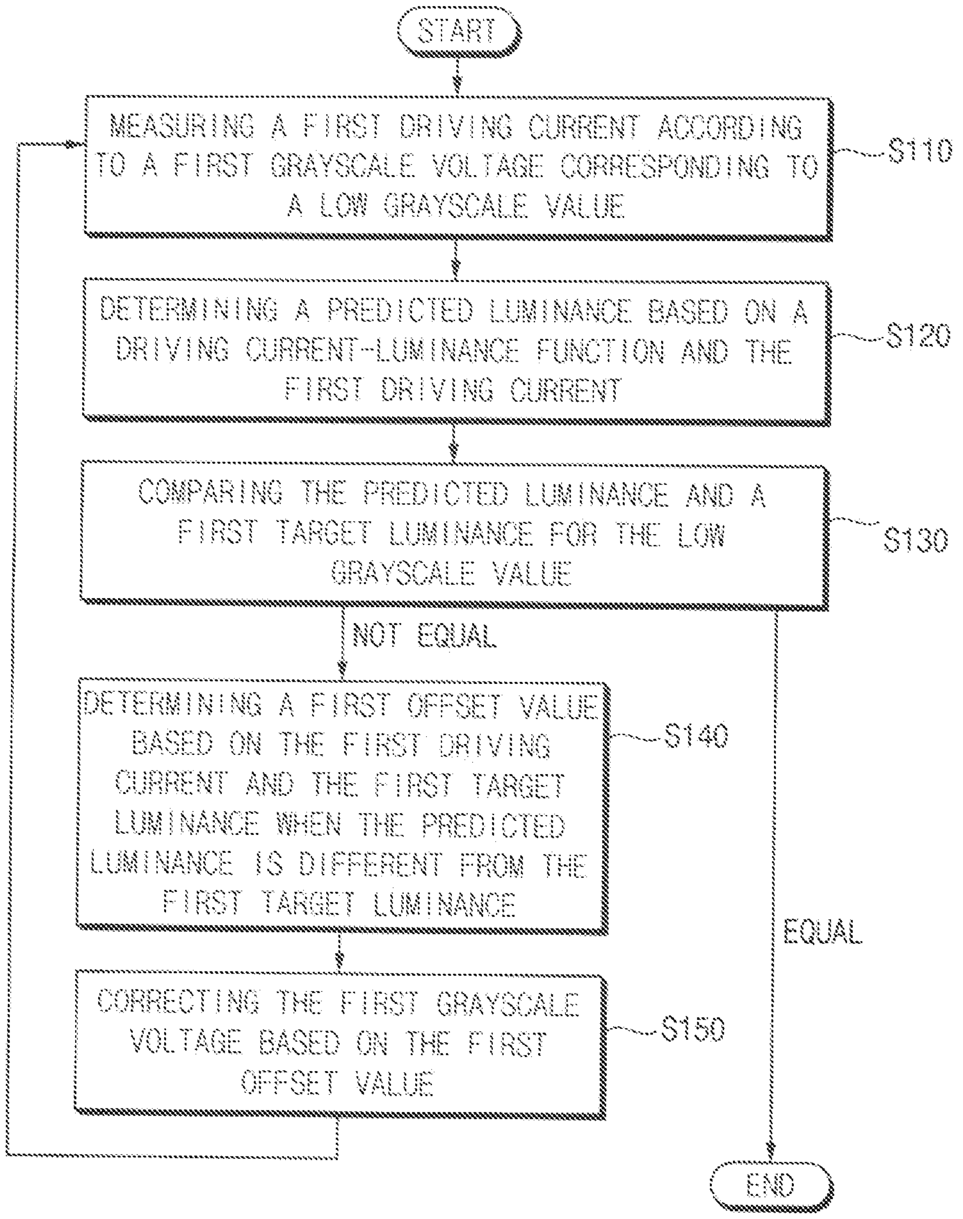
FIG. 1 is a flowchart diagram illustrating a gamma correction method for a display device according to embodiments of the present inventive concept.
Figure 2:
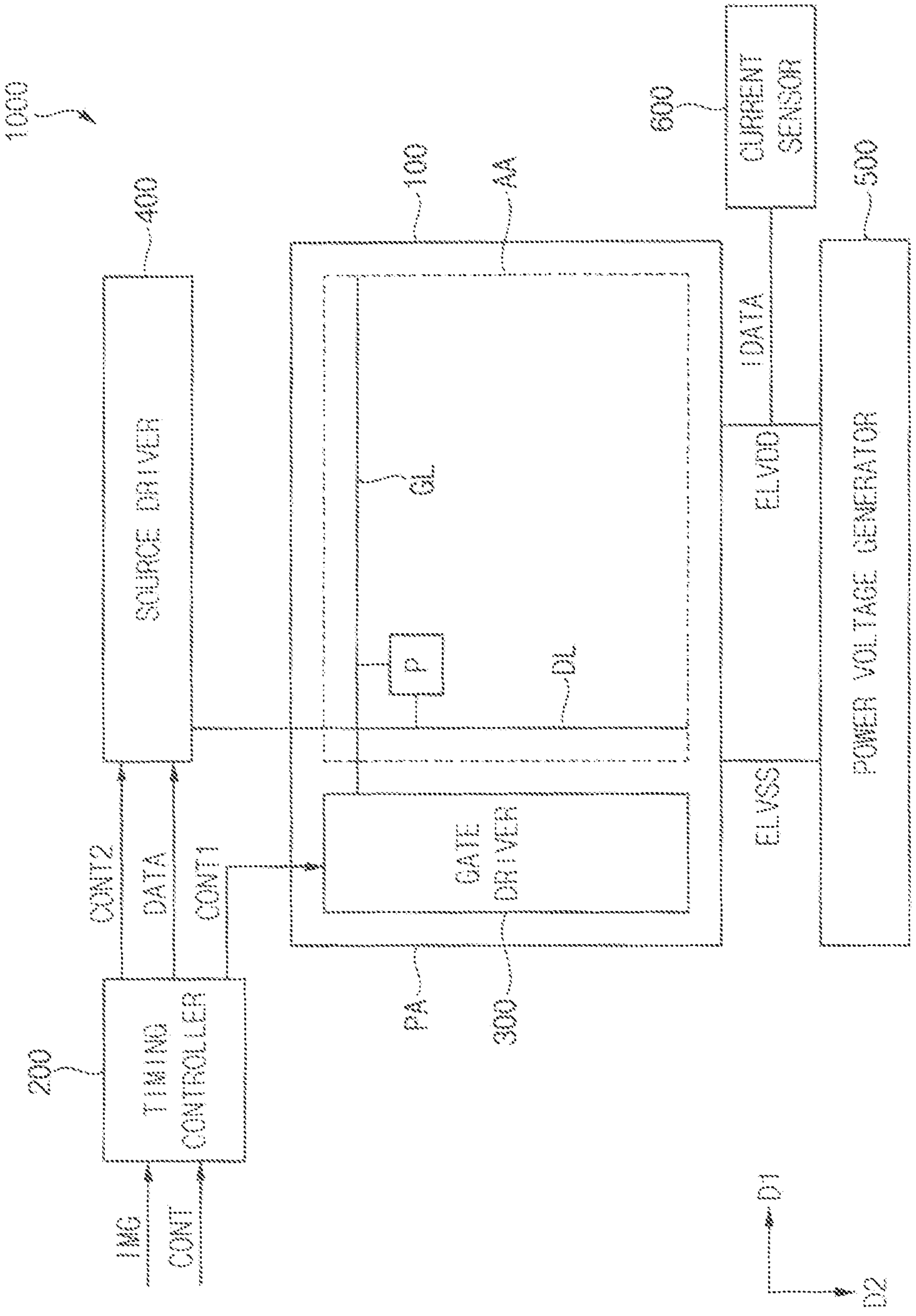
FIG. 2 is a block diagram illustrating an example of a display device according to the gamma correction method of FIG. 1.
Figures 3, 4:
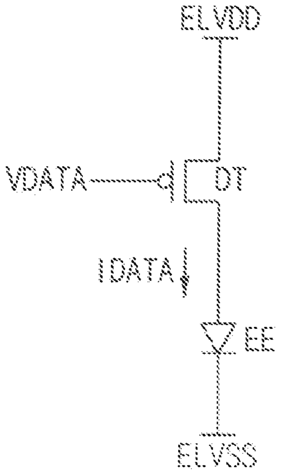
FIG. 3 is a block diagram illustrating an example of a pixel according to the gamma correction method of FIG. 1.
FIG. 4 is a tabular diagram illustrating an example of a driving current-luminance calibration function or lookup table according to the gamma correction method of FIG. 1.

FIG. 1 illustrates a gamma correction method for a display device according to an embodiment of the present inventive concept, FIG. 2 illustrates an example of a display device 1000 according to the gamma correction method of FIG. 1, and FIG. 3 illustrates an example of a pixel P according to the gamma correction method of FIG. 1.

Referring to FIG. 1, the gamma correction method of FIG. 1 may measure a first driving current according to a first grayscale voltage corresponding to a low grayscale value (S110), determine a predicted luminance based on a driving current-luminance calibration function such as a lookup table and the first driving current (S120), compare the predicted luminance and a first target luminance for the low grayscale value (S130), determine a first offset value based on the first driving current and the first target luminance when the predicted luminance is different from the first target luminance (S140), and correct the first grayscale voltage based on the first offset value (S150). The gamma correction method of FIG. 1 need not further correct the first grayscale voltage when the predicted luminance is substantially equal to the first target luminance. In the gamma correction method of FIG. 1, measuring the first driving current, determining the predicted luminance, comparing the predicted luminance and the first target luminance, determining the first offset value, and correcting the first grayscale voltage may be repeated until the predicted luminance is substantially equal to the first target luminance. A more detailed description thereof may be provided further below.

Referring to FIG. 2, the display device 1000 may include a display panel 100, a timing controller 200, a gate driver 300, a source driver 400, a power voltage generator 500, and a current sensor 600. In an embodiment, the timing controller 200 and the source driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100, without limitation thereto.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the source driver 400 based on the input control signal CONT and output the second control signal CONT2 to the source driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the source driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The source driver 400 may receive the second control signal CONT2 and the data signal DATA from the timing controller 200. The source driver 400 may convert the data signal DATA into data voltages having an analog type. The source driver 400 may output the data voltage to the data lines DL.

The power voltage generator 500 may generate a power voltage and provide the power voltage to the display panel 100. For example, the power voltage generator 600 may provide a first power voltage ELVDD and a second power voltage ELVSS applied to each of the pixels P including the light emitting element to the display panel 100. For example, the first power voltage ELVDD may be a high power voltage, and the second power voltage ELVSS may be a low power voltage.

The current sensor 600 may be connected to a power line to which a power voltage is applied, and may measure a driving current DATA flowing through the pixels P. For example, the current sensor 600 may be connected to a power line to which the first power voltage ELVDD is applied. For another example, the current sensor 600 may be connected to a power line to which the second power voltage ELVSS is applied.

Referring to FIGS. 2 and 3, each of the pixels P may include a driving transistor DT and a light emitting element EE. The driving transistor DT may include a control electrode receiving the data voltage VDATA, a first electrode receiving the first power voltage ELVDD, and a second electrode connected to the light emitting element EE. The light emitting element EE may include an anode electrode connected to the driving transistor DT and a cathode electrode receiving the second power voltage ELVSS.

The source driver 400 may determine the data voltage VDATA according to a grayscale voltage. For example, when the grayscale voltage corresponding to a 255 grayscale value is 20V, the data voltage VDATA for displaying the 255 grayscale value may be 20V.

The driving current DATA may be determined according to the data voltage VDATA applied to the control electrode of the driving transistor DT. For example, the driving current DATA may increase as the data voltage VDATA increases.

When the driving current DATA flows through the light emitting element EE, the light emitting element EE may emit light. In this case, a luminance may increase as the driving current DATA increases.

Figure 5:
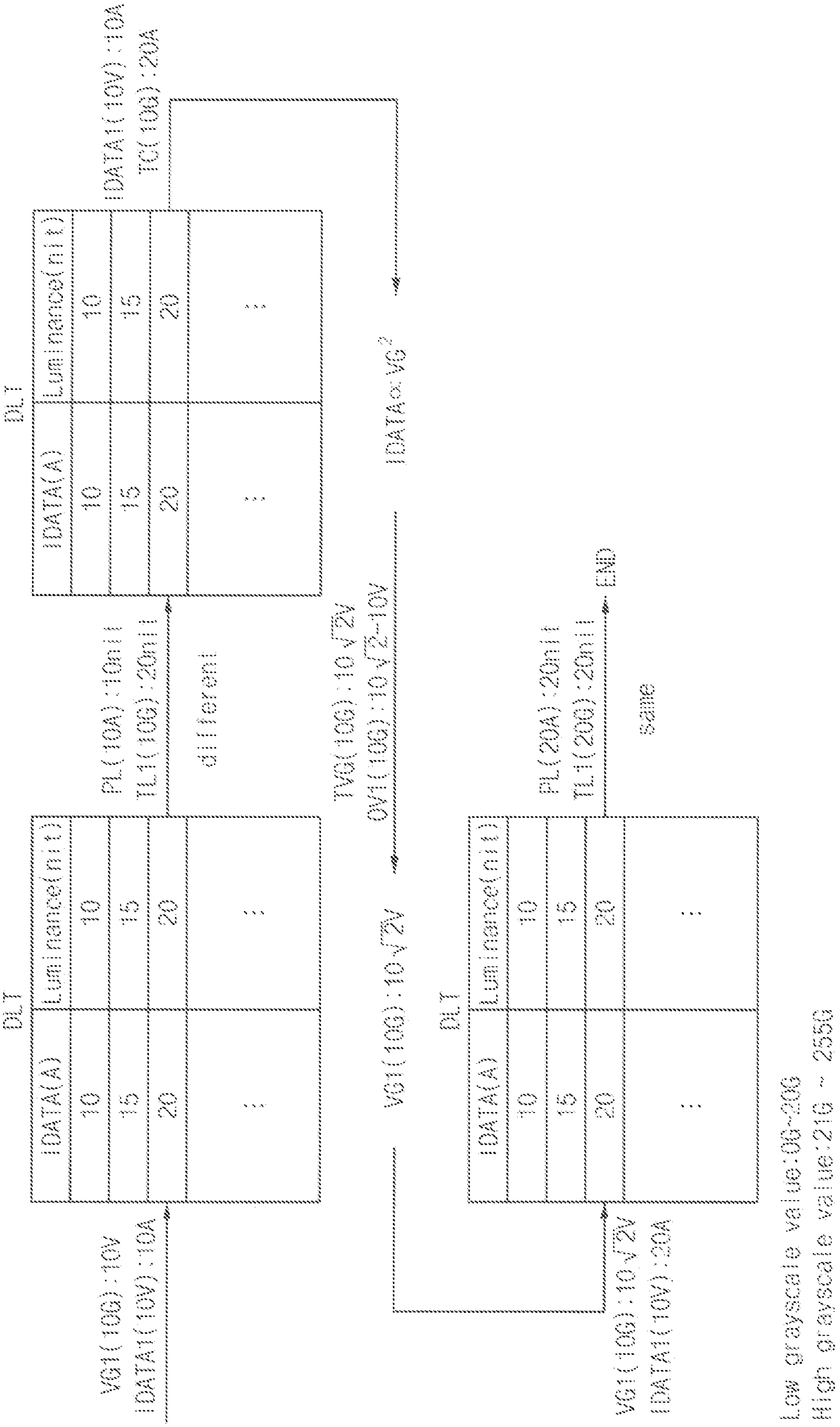
FIG. 5 is a hybrid diagram illustrating an example in which gamma correction is performed according to the gamma correction method of FIG. 1.

FIG. 4 illustrates an example of a driving current-luminance calibration function or lookup table according to the gamma correction method of FIG. 1, and FIG. 5 illustrates an example in which gamma correction is performed according to the gamma correction method of FIG. 1.

Referring to FIGS. 1 to 5, the gamma correction method may measure the first driving current IDATA1 according to the first grayscale voltage VG1 corresponding to the low grayscale value (S110). A range of the low grayscale value may be determined by a user. For example, when a grayscale value has a value of 0 to 255, a 0 grayscale value 0G to a 20 grayscale value 20G may be determined as the range of low grayscale values, and a 21 grayscale value 21G to the 255 grayscale value 255G may be determined as the range of high grayscale values, without limitation thereto. Hereinafter, it is assumed that the range of the low grayscale value is from the 0 grayscale value 0G to the 20 grayscale value 20G, and the range of the high grayscale value is from the 21 grayscale value 21G to the 255 grayscale value 255G.

The first grayscale voltage VG1 may be the grayscale voltage VG for displaying the low grayscale value. For example, the first grayscale voltage VG1 may be a grayscale voltage VG for displaying grayscale values between the 0 grayscale value 0G and the 20 grayscale value 20G.

The first driving current IDATA1 may be the driving current DATA flowing through the pixel P when the first grayscale voltage VG1 is applied to the pixel P. For example, the first driving current IDATA1 may be the driving current DATA flowing through the pixel P when grayscale values between the 0 grayscale value 0G and the 20 grayscale value 20G are displayed.

The gamma correction method of FIG. 1 may determine a predicted luminance PL based on a driving current-luminance calibration function or lookup table DLT and the first driving current IDATA1 (S120). The gamma correction method of FIG. 1 may measure the luminance according to the first grayscale voltage VG1 once. The driving current-luminance calibration function or lookup table DLT may include the luminance according to the first grayscale voltage VG1.

The driving current-luminance calibration function or lookup table DLT may be used to predict the luminance to be displayed by the driving current DATA from the first driving current IDATA1. Accordingly, in the gamma correction method of FIG. 1, it may be superfluous to measure the luminance of each of the grayscale values more than once to perform gamma correction for the low grayscale value.

The gamma correction method of FIG. 1 may measure the luminance according to the first gray voltage VG1 by running once to generate the driving current-luminance calibration function or lookup table DLT. For example, when the luminance measured when the driving current of 10 A flows through the pixel P in one measurement is 10 nit, the driving current-luminance calibration function or lookup table DLT may include a luminance of 10 nit corresponding to the driving current IDATA of 10 A. In addition, an unmeasured driving current-luminance calibration function may be determined through interpolation of measured values. However, the gamma correction method of according to the present inventive concept is not limited thereto. For example, in the gamma correction method of FIG. 1, the luminance according to the first grayscale voltage VG1 may be measured twice or more.

The predicted luminance PL may be a luminance predicted from the first driving current IDATA1 using the driving current-luminance calibration function or lookup table DLT. For example, when the driving current-luminance calibration function or lookup table DLT includes a luminance of 10 nit corresponding to the driving current DATA of 10 A, the predicted luminance PL predicted from the first driving current IDATA1 of 10 A may be 10 nit.

The gamma correction method of FIG. 1 may compare the predicted luminance PL and a first target luminance TL1 for the low grayscale value (S130). The first target luminance TL1 for the low grayscale value may be a luminance set so that the display device has a gamma characteristic corresponding to a target gamma value in the low grayscale value.

For example, the gamma correction may be a process of determining a maximum luminance and correcting the luminance of each of the grayscale values to have the gamma characteristic corresponding to the target gamma value. For example, when the maximum luminance is determined to be 500 nit and the target gamma value is 2.2, the luminance of each of the grayscale values may be determined so that the luminance of the 255 grayscale value becomes 500 nit and a grayscale-luminance curve has a gamma value of 2.2. In this case, the determined luminance for the low grayscale value may be the first target luminance TL1.

The gamma correction method of FIG. 1 may determine a first offset value OV1 based on the first driving current IDATA1 and the first target luminance TL1 when the predicted luminance PL is different from the first target luminance TL1 (S140), and correct the first grayscale voltage VG1 based on the first offset value OV1 (S150). The gamma correction method of FIG. 1 may determine a target current TC using the driving current-luminance calibration function or lookup table DLT and the first target luminance LT1, determine a target grayscale voltage TVG using a driving current-grayscale voltage calibration function or expression, the first driving current IDATA1, and the target current TC, and determine the first offset value OV1 by subtracting the first grayscale voltage VG1 from the target grayscale voltage TVG. The first grayscale voltage VG1 may be corrected by adding the first offset value OV1 to the first grayscale voltage VG1.

The target current TC may be the driving current DATA flowing through the pixel P to display the first target luminance TL1. Similarly to determining the predicted luminance PL from the first driving current IDATA1 using the driving current-luminance calibration function or lookup table DLT, the gamma correction method of FIG. 1 may use the driving current-luminance calibration function or lookup table DLT to determine the target current TC from the first target luminance TL1.

The target grayscale voltage TVG may be the grayscale voltage VG that causes the target current TC to flow through the pixel P. The driving current-grayscale voltage calibration function or expression may be used to determine the target grayscale voltage TVG. In an embodiment, the driving current-grayscale voltage calibration function or expression may be updated according to the first driving current IDATA1.

For example, initially, the driving current-grayscale voltage calibration function or expression may represent an ideal calibration or theoretical function between the driving current DATA and the grayscale voltage VG (i.e., the calibration function between the driving current DATA and the data voltage VDATA). For example, initially, the driving current-grayscale voltage calibration function or expression may be $IDATA \propto VG^2$. Here, DATA may be the driving current, and VG may be the grayscale voltage. However, since there are several external factors affecting the calibration function between the driving current DATA and the grayscale voltage VG, the driving current-grayscale voltage calibration function or expression may be updated to match actual data based on data on the calibration function between the driving current DATA and the grayscale voltage VG, which is accumulated as the first driving current IDATA1 is measured.

The first offset value OV1 may be added to the first grayscale voltage VG1 such that the first grayscale voltage VG1 becomes the target grayscale voltage TVG. However, since the first offset value OV1 is determined using a value predicted through the driving current-luminance calibration function or lookup table DLT and the driving current-grayscale voltage calibration function or expression, the first grayscale voltage VG1 and the target grayscale voltage TVG may not be able to match with one gamma correction. Therefore, in the gamma correction method of FIG. 1, measuring the first driving current IDATA1, determining the predicted luminance PL, comparing the predicted luminance PL and the first target luminance TL1, determining the first offset value OV1, and correcting the first grayscale voltage VG1 may be repeated until the predicted luminance PL is substantially equal to the first target luminance TL1. That is, in the gamma correction method of FIG. 1, when the predicted luminance PL is substantially equal to the first target luminance TL1, the first grayscale voltage VG1 need not be corrected. Hereinafter, a series of processes will be described with reference to FIG. 5.

For example, it is assumed that the first grayscale voltage VG1 corresponding to 10 grayscale value 10G is initially 10V, the driving current DATA (i.e., the first driving current IDATA1 according to the first grayscale voltage VG1 corresponding to the 10 grayscale value 10G) is 10 A when the data voltage VDATA of 10V is applied, the driving current-luminance calibration function or lookup table DLT is as shown in FIG. 4, the driving current-grayscale voltage calibration function or expression is $IDATA \propto VG^2$, and the first target luminance TL1 for the 10 grayscale value 10G is 20 nit. In this case, the predicted luminance PL may be 10 nit different from the first target luminance TL1. Since the first target luminance TL1 is 20 nit, the target current TC may be 20 A. Since the first driving current IDATA1 has to be doubled to become the target current TC, the target grayscale voltage TVG may be $10/\sqrt{2}$ V. Accordingly, the first offset value OV1 may be $10/\sqrt{2}-10$ V, and the first grayscale voltage VG1 may be corrected to $10/\sqrt{2}$ V. And, assuming that the driving current DATA (i.e., the first driving current IDATA1 according to the corrected first grayscale voltage VG1 corresponding to the 10 grayscale value 10G) is 20 A when the data voltage VDATA of $10/\sqrt{2}$ V is applied, the predicted luminance PL may be 20 nit or substantially equal to the first target luminance TL1. Accordingly, the gamma correction method of FIG. 1 need not correct the first grayscale voltage VG1 any further.

Figure 6:
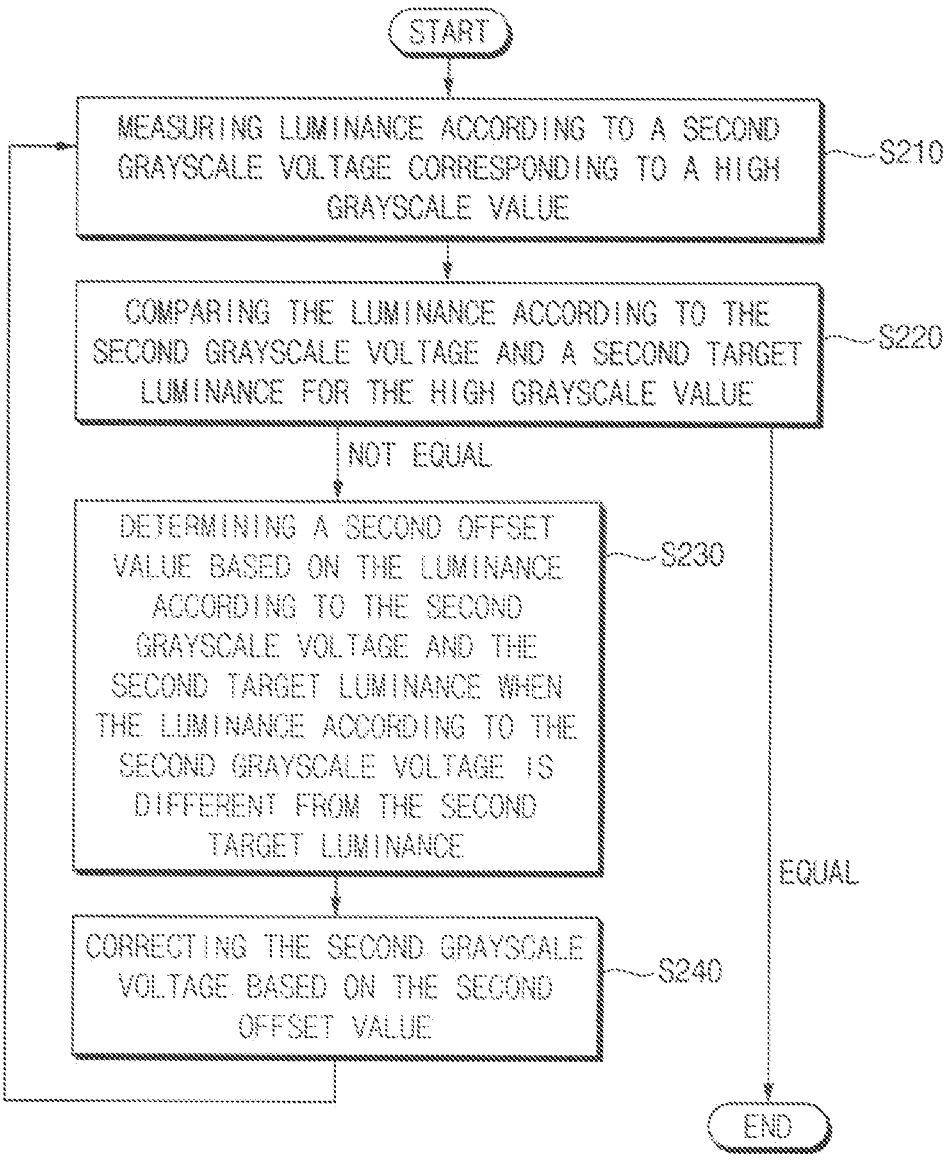
FIG. 6 is a flowchart diagram illustrating the gamma correction method of FIG. 1.

FIG. 6 illustrates the gamma correction method of FIG. 1.

Referring to FIGS. 2, 3, and 6, the gamma correction method of FIG. 1 may measure the luminance according to a second grayscale voltage corresponding to the high grayscale value (S210), compare the luminance according to the second grayscale voltage and a second target luminance for the high grayscale value (S220), determine a second offset value based on the luminance according to the second grayscale voltage and the second target luminance when the luminance according to the second grayscale voltage is different from the second target luminance (S230), and correct the second grayscale voltage based on the second offset value (S240).

The second grayscale voltage may be a grayscale voltage for displaying the high grayscale value. For example, the second grayscale voltage may be a grayscale voltage for displaying between the 21 grayscale value and the 255 grayscale value.

The luminance according to the second grayscale voltage may be the luminance displayed when the second grayscale voltage is applied to the pixel P. For example, the luminance according to the second grayscale voltage may be the luminance displayed when grayscale values between 21 grayscale value and 255 grayscale value are displayed.

The gamma correction method of FIG. 1 may compare the luminance according to the second grayscale voltage and a second target luminance for the high grayscale value (S220). The second target luminance for the high grayscale may be a luminance set so that the display device has a gamma characteristic corresponding to the target gamma value in the high grayscale.

For example, the gamma correction may be a process of determining a maximum luminance and correcting the luminance of each of the grayscale values to have the gamma characteristic corresponding to the target gamma value. For example, when the maximum luminance is determined to be 500 nit and the target gamma value is 2.2, the luminance of each of the grayscale values may be determined so that the luminance of the 255 grayscale value becomes 500 nit and a grayscale-luminance curve has a gamma value of 2.2. In this case, the determined luminance for the high grayscale value may be the second target luminance.

The gamma correction method of FIG. 1 may determine a second offset value based on the luminance according to the second grayscale voltage and the second target luminance when the luminance according to the second grayscale voltage is different from the second target luminance (S230), and correct the second grayscale voltage based on the second offset value (S240). The second grayscale voltage may be corrected by adding the second offset value to the second grayscale voltage. For example, an absolute value of the second offset value may increase as a difference between the luminance according to the second grayscale voltage and the second target luminance increases. However, in the gamma correction method of FIG. 1, measuring luminance may be repeated several times while changing the second offset value so that the luminance according to the second grayscale voltage becomes the second target luminance. Accordingly, in the gamma correction method of FIG. 1, measuring the luminance according to the second grayscale voltage, comparing the luminance according to the second grayscale voltage and the second target luminance for the high grayscale value, determining the second offset value, and correcting the second grayscale voltage may be repeated until the luminance according to the second grayscale voltage is substantially equal to the second target luminance.

Figure 7:
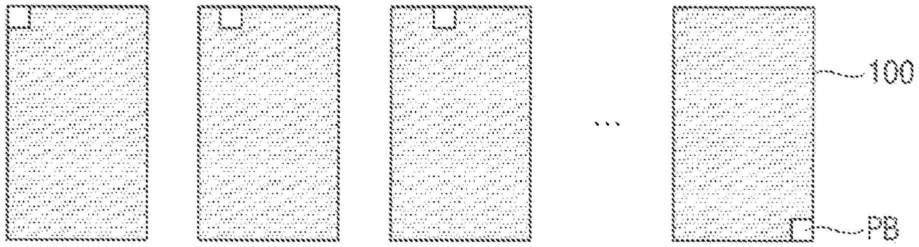
FIG. 7 is a block diagram illustrating panel blocks of a gamma correction method for a display device according to embodiments of the present inventive concept.

FIG. 7 illustrates panel blocks PB of a gamma correction method for a display device according to an embodiment of the present inventive concept.

The display device according to the present embodiment is substantially the same as the display device 1000 of FIG. 1 except for determining the target grayscale voltage. Thus, the same reference numerals are used to refer to the same or similar element, and any repetitive explanation will be omitted.

Referring to FIGS. 2, 3, and 7, the gamma correction method of FIG. 7 may separately drive each of the panel blocks PB of the display panel 100 to measure the first driving current for each of the panel blocks PB according to the first grayscale voltage, and calculate a deviation of the first driving current according to a position of each of the panel blocks. The target grayscale voltage may be determined differently for each position of the display panel according to the deviation of the first driving current.

The panel blocks PB may be regions in which the display panel 100 is divided into predetermined sizes. Even when the same data voltage VDATA is applied to each of the panel blocks PB, the driving current DATA may be different depending on the position of the display panel 100 (i.e., a deviation of the first driving current may occur). Accordingly, in determining the target grayscale voltage from the target current, it may be productive to reflect the deviation of the first driving current.

For example, the deviation of the first driving current may be determined based on the first driving current measured by displaying a white grayscale (i.e., 255 grayscale value) to each of the panel blocks PB and displaying a black grayscale (i.e., 0 grayscale value) to a region of the display panel 100 except for each of the panel blocks PB. For example, the deviation of the first driving current may be determined based on the first driving current of a central panel block PB. In another example, the deviation of the first driving current may be determined based on an average value of the first driving currents of substantially all of the panel blocks PB.

Figure 8:
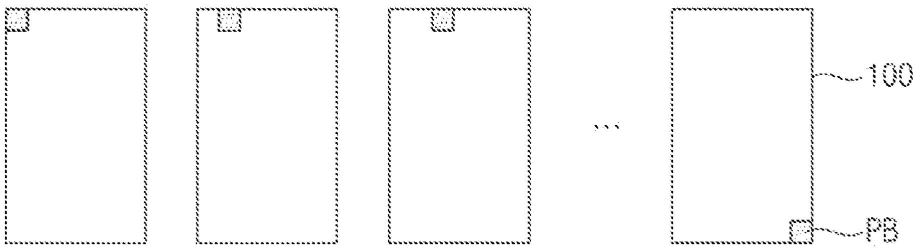
FIG. 8 is a block diagram illustrating panel blocks of a gamma correction method for a display device according to embodiments of the present inventive concept.

FIG. 8 illustrates panel blocks PB of a gamma correction method for a display device according to an embodiment of the present inventive concept.

The display device according to the present embodiment is substantially the same as the display device 1000 of FIG. 1 except for determining the target grayscale voltage. Thus, the same reference numerals are used to refer to the same or similar element, and any repetitive explanation will be omitted.

Referring to FIGS. 2, 3, and 8, the gamma correction method of FIG. 8 may separately drive a region of the display panel 100 except for each of the panel blocks PB of the display panel 100 to measure the first driving current for the region of the display panel 100 except for each of the panel blocks PB according to the first grayscale voltage, and calculate a deviation of the first driving current according to a position of each of the panel blocks PB. The target grayscale voltage may be determined differently for each position of the display panel according to the deviation of the first driving current.

For example, the deviation of the first driving current may be determined based on the first driving current measured by displaying the black grayscale (i.e., 0 grayscale value) to each of the panel blocks PB and displaying the white grayscale (i.e., 255 grayscale value) to a region of the display panel 100 except for each of the panel blocks PB. For example, the deviation of the first driving current may be determined based on the first driving current of a central panel block PB. In another example, the deviation of the first driving current may be determined based on an average value of the first driving currents of substantially all of the panel blocks PB.

Figure 9:
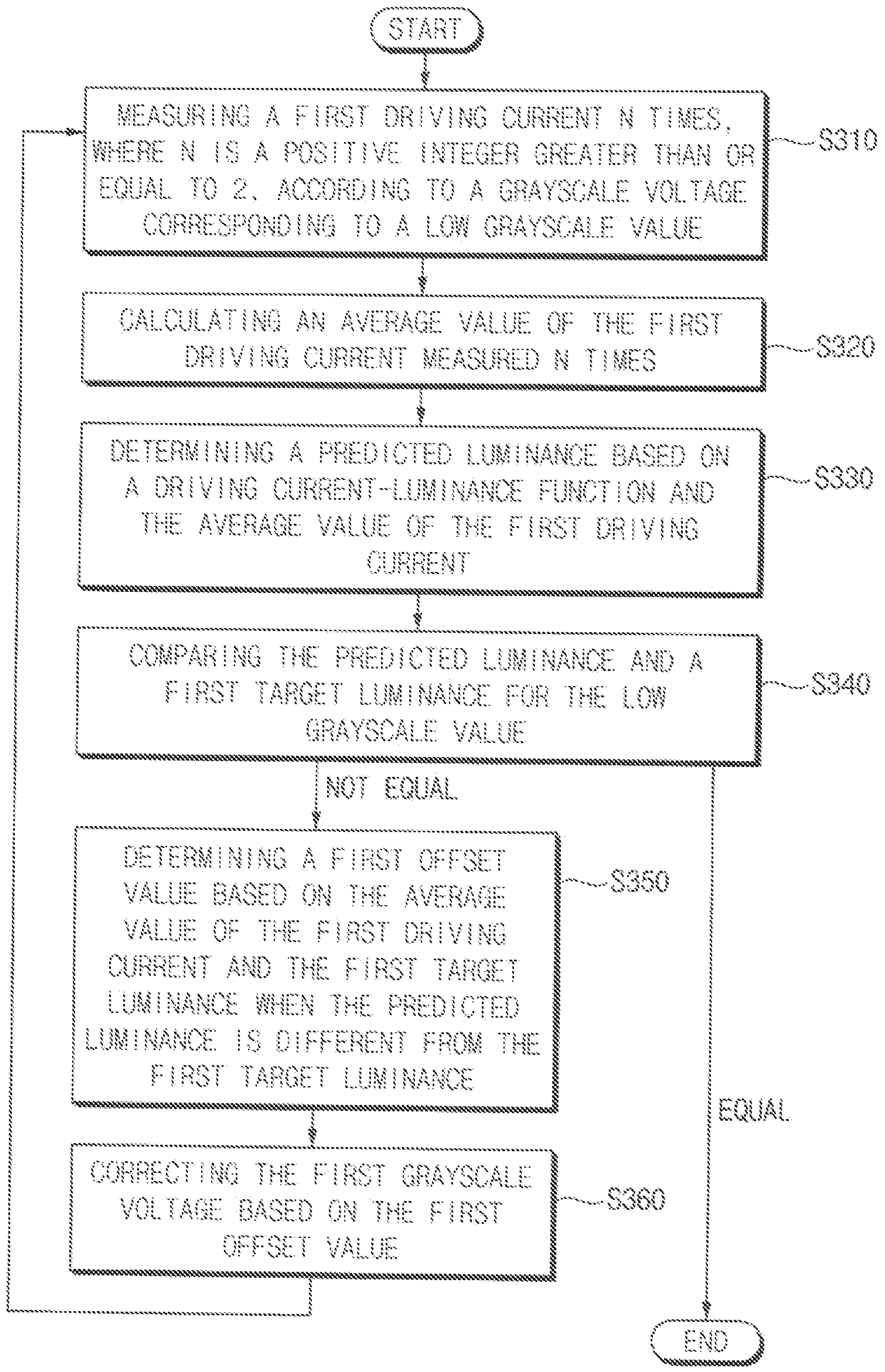
FIG. 9 is a flowchart diagram illustrating a gamma correction method for a display device according to embodiments of the present inventive concept.

FIG. 9 illustrates a gamma correction method for a display device according to an embodiment of the present inventive concept.

The display device according to the present embodiment is substantially the same as the display device 1000 of FIG. 1 except for using an average value of the first driving current instead of the first driving current. Thus, the same reference numerals are used to refer to the same or similar element, and any repetitive explanation will be omitted.

The gamma correction method of FIG. 9 may measure the first driving current N times, where N is a positive integer greater than or substantially equal to 2, according to the grayscale voltage corresponding to the low grayscale value (S310), calculate the average value of the first driving current measured N times (S320), determine the predicted luminance based on the driving current-luminance calibration function or lookup table and the average value of the first driving current (S330), compare the predicted luminance and the first target luminance for the low grayscale value (S340), determine the first offset value based on the average value of the first driving current and the first target luminance when the predicted luminance is different from the first target luminance (S350), and correct the first grayscale voltage based on the first offset value (S360). Also, the gamma correction method of FIG. 9 may determine the target grayscale voltage using the driving current-grayscale voltage calibration function or expression, the average value of the first driving current, and the target current. Accordingly, the gamma correction method of FIG. 9 may perform the gamma correction more accurately than the gamma correction method of FIG. 1.

Figure 10:
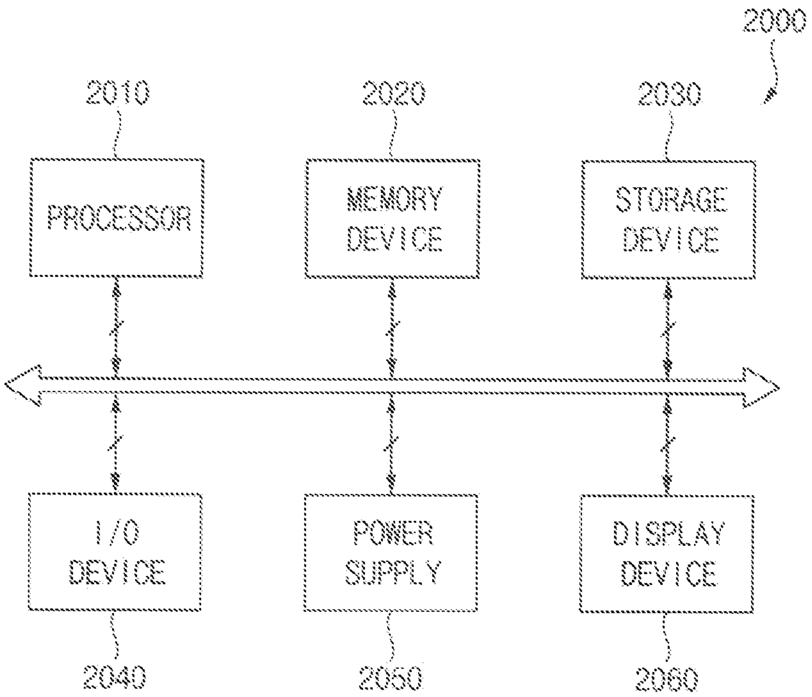
FIG. 10 is a block diagram showing an electronic device according to embodiments of the present inventive concept.
Figure 11:
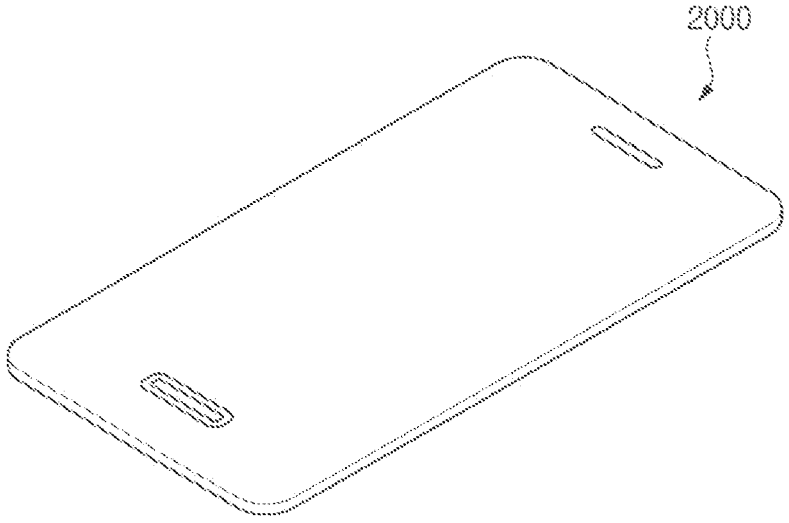
FIG. 11 is a perspective diagram showing an example in which the electronic device of FIG. 10 is implemented as a smart phone.

FIG. 10 shows an electronic device according to an embodiment of the present inventive concept, and FIG. 11 shows an example in which the electronic device of FIG. 10 is implemented as a smart phone.

Referring to FIGS. 10 and 11, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 2. In addition, the electronic device 2000 may further include a plurality of ports for communicating with a video card, a sound card, a memory card, a universal serial bus (USB) device, other electronic devices, or the like. In an embodiment, as shown in FIG. 11, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, or the like.

The processor 2010 may perform various computing functions. The processor 2010 may be a microprocessor, a central processing unit (CPU), an application processor (AP), or the like. The processor 2010 may be coupled to other components via an address bus, a control bus, a data bus, or the like. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 2030 may include a solid state drive (SSD) device, a hard disk drive (HDD) device, a CD-ROM device, or the like.

The I/O device 2040 may include an input device such as a keyboard, a keypad, a mouse device, a touch pad, a touch screen, or the like, and an output device such as a printer, a speaker, or the like. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may measure the driving current to perform the gamma correction for the low grayscale value. Accordingly, the gamma correction method may shorten a process time of the gamma correction compared to performing the gamma correction for the low grayscale value by measuring luminance.

In an embodiment, the gamma correction method for the display device 2060 may measure the first driving current according to the first grayscale voltage corresponding to the low grayscale value, determine the predicted luminance based on the driving current-luminance calibration function or lookup table and the first driving current, compare the predicted luminance and the first target luminance for the low grayscale value, determine a first offset value based on the first driving current and the first target luminance when the predicted luminance is different from the first target luminance, and correct the first grayscale voltage based on the first offset value. Since these are described with reference to FIGS. 1 to 8, duplicated description related thereto will not be repeated.

In another embodiment, the gamma correction method for the display device 2060 may measure the first driving current N times according to the grayscale voltage corresponding to the low grayscale value, calculate the average value of the first driving current measured N times, determining the predicted luminance based on the driving current-luminance calibration function or lookup table and the average value of the first driving current, compare the predicted luminance and the first target luminance for the low grayscale value, determine the first offset value based on the average value of the first driving current and the first target luminance when the predicted luminance is different from the first target luminance, and correct the first grayscale voltage based on the first offset value. Since these are described with reference to FIG. 9, duplicated description related thereto will not be repeated.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, or the like.

The foregoing is illustrative of the present inventive concept and is not to be construed as limiting thereof. Although embodiments of the present inventive concept have been described, those of ordinary skill in the pertinent art will readily appreciate that many modifications are possible in the described and other embodiments without materially departing from the novel teachings and advantages of the present inventive concept. Accordingly, such modifications are intended to be included within the scope of the present inventive concept as defined in the claims. In the claims, any means-plus-function clauses are intended to cover the structures described herein as performing the recited function and, not only structural equivalents, but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A gamma correction method for a display device comprising:
- measuring a first driving current according to a first grayscale voltage corresponding to a low grayscale value;
- determining a predicted luminance based on a driving current-luminance calibration function and the first driving current;
- comparing the predicted luminance and a first target luminance for the low grayscale value;
- determining a first offset value based on the first driving current and the first target luminance when the predicted luminance is different from the first target luminance; and
- correcting the first grayscale voltage based on the first offset value.

2. The gamma correction method of claim 1, further comprising:
- measuring luminance according to a second grayscale voltage corresponding to a high grayscale value;
- comparing the luminance according to the second grayscale voltage and a second target luminance for the high grayscale value;
- determining a second offset value based on the luminance according to the second grayscale voltage and the second target luminance when the luminance according to the second grayscale voltage is different from the second target luminance; and
- correcting the second grayscale voltage based on the second offset value.

3. The gamma correction method of claim 1, further comprising:
- not further correcting the first grayscale voltage when the predicted luminance is substantially equal to the first target luminance.

4. The gamma correction method of claim 3, wherein measuring the first driving current, determining the predicted luminance, comparing, determining the first offset value, and correcting the first grayscale voltage are repeated until the predicted luminance is substantially equal to the first target luminance.

5. The gamma correction method of claim 1, further comprising:
- measuring a luminance according to the first grayscale voltage once,
- wherein the driving current-luminance calibration function is defined by a lookup table that includes the luminance according to the first grayscale voltage.

6. The gamma correction method of claim 1, wherein determining the first offset value comprises:

determining a target current using the driving current-luminance calibration function and the first target luminance;

determining a target grayscale voltage using a driving current-grayscale voltage calibration function or expression, the first driving current, and the target current; and determining the first offset value by subtracting the first grayscale voltage from the target grayscale voltage.

7. The gamma correction method of claim 6, wherein the driving current-grayscale voltage calibration function or expression is updated according to the first driving current.

8. The gamma correction method of claim 6, further comprising:

separately driving each of panel blocks of a display panel to measure the first driving current for each of the panel blocks according to the first grayscale voltage; and calculating a deviation of the first driving current according to a position of each of the panel blocks, wherein the target grayscale voltage is determined differently for each position of the display panel according to the deviation of the first driving current.

9. The gamma correction method of claim 6, further comprising:

separately driving a region of a display panel except for each of panel blocks of the display panel to measure the first driving current for the region of the display panel except for each of the panel blocks according to the first grayscale voltage; and calculating a deviation of the first driving current according to a position of each of the panel blocks, wherein the target grayscale voltage is determined differently for each position of the display panel according to the deviation of the first driving current.

10. The gamma correction method of claim 1, wherein the first grayscale voltage is corrected by adding the first offset value to the first grayscale voltage.

11. The gamma correction method of claim 1, wherein the first driving current is measured by a current sensor connected to a power line to which a power voltage is applied, and wherein the power voltage is applied to a display panel through the power line.

12. A gamma correction method for a display device comprising:

measuring a first driving current N times, where N is a positive integer greater than or substantially equal to 2, according to a grayscale voltage corresponding to a low grayscale value;

calculating an average value of the first driving current measured N times;

determining a predicted luminance based on a driving current-luminance calibration function and the average value of the first driving current;

comparing the predicted luminance and a first target luminance for the low grayscale value;

determining a first offset value based on the average value of the first driving current and the first target luminance when the predicted luminance is different from the first target luminance; and correcting the first grayscale voltage based on the first offset value.

13. The gamma correction method of claim 12, further comprising:

measuring luminance according to a second grayscale voltage corresponding to a high grayscale value;

comparing the luminance according to the second grayscale voltage and a second target luminance for the high grayscale value;

determining a second offset value based on the luminance according to the second grayscale voltage and the second target luminance when the luminance according to the second grayscale voltage is different from the second target luminance; and correcting the second grayscale voltage based on the second offset value.

14. The gamma correction method of claim 12, further comprising:

measuring a luminance according to the first grayscale voltage once, wherein the driving current-luminance calibration function is defined by a lookup table that includes the luminance according to the first grayscale voltage.

15. The gamma correction method of claim 12, wherein determining the first offset value comprises:

determining a target current using the driving current-luminance calibration function and the first target luminance;

determining a target grayscale voltage using a driving current-grayscale voltage calibration function or expression, the average value of the first driving current, and the target current; and determining the first offset value by subtracting the first grayscale voltage from the target grayscale voltage.

16. The gamma correction method of claim 15, wherein the driving current-grayscale voltage calibration function or expression is updated according to the first driving current.

17. The gamma correction method of claim 15, further comprising:

separately driving each of panel blocks of a display panel to measure the first driving current for each of the panel blocks according to the first grayscale voltage; and calculating a deviation of the first driving current according to a position of each of the panel blocks, wherein the target grayscale voltage is determined differently for each position of the display panel according to the deviation of the first driving current.

18. The gamma correction method of claim 15, further comprising:

separately driving a region of a display panel except for each of panel blocks of the display panel to measure the first driving current for the region of the display panel except for each of the panel blocks according to the first grayscale voltage; and calculating a deviation of the first driving current according to a position of each of the panel blocks, wherein the target grayscale voltage is determined differently for each position of the display panel according to the deviation of the first driving current.

19. The gamma correction method of claim 12, wherein the first grayscale voltage is corrected by adding the first offset value to the first grayscale voltage.

20. The gamma correction method of claim 12, wherein the first driving current is measured by a current sensor connected to a power line to which a power voltage is applied, and wherein the power voltage is applied to a display panel through the power line.

* * * * *